(12) United States Patent
Barton et al.

(10) Patent No.: US 12,010,603 B2
(45) Date of Patent: Jun. 11, 2024

(54) INTERNATIONAL CALL ROUTE GENERATION BASED ON ANALYZING MINUTES OF USE KEY PERFORMANCE INDICATORS (KPIS) ASSOCIATED WITH AN INTERNATIONAL COMMUNICATION SERVICE CARRIER

(71) Applicant: T-Mobile Innovations LLC, Overland Park, KS (US)

(72) Inventors: Jia Barton, Foster City, CA (US); Prakasa R. Bellam, Snohomish, WA (US); Manuel Berumen, Phoenix, AZ (US); Quang B. Doan, Roseville, CA (US); Arulraj Duraisamy, Mountain House, CA (US); Muhammad Nauhman Bashir Gora, Irvine, CA (US); Gerald R. Jordan, Jr., Kansas City, KS (US); Ramaswami Rangarajan, Belmont, CA (US); Gopalakrishna Sagar, Santa Clara, CA (US); Michael Tsai, Cupertino, CA (US); Kun-cheng Yang, Hayward, CA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/194,440

(22) Filed: Mar. 31, 2023

(65) Prior Publication Data
US 2023/0247516 A1  Aug. 3, 2023

Related U.S. Application Data

(62) Division of application No. 17/332,146, filed on May 27, 2021, now Pat. No. 11,653,284.

(51) Int. Cl.
*H04W 40/00* (2009.01)
*H04L 45/42* (2022.01)
(Continued)

(52) U.S. Cl.
CPC ............. *H04W 40/04* (2013.01); *H04L 45/42* (2013.01); *H04M 7/0075* (2013.01); *H04M 15/772* (2013.01)

(58) Field of Classification Search
CPC ........ H04W 40/04; H04W 4/24; H04L 45/42; H04M 7/0075; H04M 15/772;
(Continued)

(56) References Cited

U.S. PATENT DOCUMENTS

| 7,412,051 | B1 | 8/2008 | Beathard et al. |
| 7,457,279 | B1 | 11/2008 | Scott et al. |

(Continued)

OTHER PUBLICATIONS

Notice of Allowance dated Sep. 21, 2023, U.S. Appl. No. 18/302,599, filed Apr. 18, 2023.
(Continued)

*Primary Examiner* — Pakee Fang

(57) ABSTRACT

A central routing function (CRF) platform. The CRF platform comprises at least one processor; a non-transitory memory communicatively coupled to the at least one processor that stores a plurality of prioritized international call route lists where each prioritized international call route list associates alternative international communication service carrier routes in a prioritized order with an international telephone number; and a call process application stored in the non-transitory memory that, when executed by the processor, receives a request for a prioritized international call route list from a network element, where the request comprises an international telephone number, pads out the international telephone number received from the network element to form a 15-digit number, looks up a prioritized
(Continued)

international route list using the 15-digit number in the non-transitory memory, and sends the prioritized international route list to the network element.

20 Claims, 5 Drawing Sheets

(51) Int. Cl.
*H04M 7/00* (2006.01)
*H04M 15/00* (2006.01)
*H04W 40/04* (2009.01)

(58) Field of Classification Search
CPC .. H04M 15/00; H04M 15/80; H04M 15/8044; H04M 15/8055; H04M 15/8061
USPC ........................................................ 455/428
See application file for complete search history.

(56) References Cited

U.S. PATENT DOCUMENTS

| | | | |
|---|---|---|---|
| 8,199,670 | B2 | 6/2012 | Mishra et al. |
| 8,605,585 | B2 | 12/2013 | Duan |
| 8,750,884 | B1 | 6/2014 | Gorman et al. |
| 10,225,181 | B2 | 3/2019 | Scott et al. |
| 10,582,043 | B1* | 3/2020 | Eichhorn ............... H04M 1/575 |
| 11,394,642 | B1 | 7/2022 | Barton et al. |
| 11,463,589 | B1 | 10/2022 | Barton et al. |
| 11,627,076 | B2 | 4/2023 | Barton et al. |
| 11,653,284 | B1 | 5/2023 | Barton et al. |
| 11,888,598 | B1 | 1/2024 | Barton et al. |
| 2001/0012775 | A1* | 8/2001 | Modzelesky ......... H04W 12/06 455/430 |
| 2005/0281199 | A1 | 12/2005 | Simpson et al. |
| 2007/0047706 | A1 | 3/2007 | Starling |
| 2007/0283042 | A1 | 12/2007 | West et al. |
| 2008/0198998 | A1 | 8/2008 | Aleynikov |
| 2010/0220852 | A1 | 9/2010 | Willman |
| 2012/0117235 | A1 | 5/2012 | Castro et al. |
| 2012/0155628 | A1 | 6/2012 | Booth et al. |
| 2016/0277591 | A1* | 9/2016 | Trapp .................... H04M 15/70 |
| 2017/0034357 | A1 | 2/2017 | Salomon et al. |
| 2021/0233097 | A1 | 7/2021 | Doumar et al. |
| 2023/0006923 | A1 | 1/2023 | Barton et al. |
| 2023/0247516 | A1 | 8/2023 | Barton et al. |

OTHER PUBLICATIONS

Barton, Jia, et al., "Central Routing Function (CRF) Implementation on a Call Route," filed Apr. 18, 2023, U.S. Appl. No. 18/302,599.
Notice of Allowance dated Mar. 23, 2022, U.S. Appl. No. 17/364,785, filed Jun. 30, 2021.
Notice of Allowance dated Jun. 1, 2022, U.S. Appl. No. 17/361,179, filed Jun. 28, 2021.
Restriction Requirement dated Oct. 18, 2022, U.S. Appl. No. 17/332,146, filed May 21, 2021.
Notice of Allowance dated Jan. 19, 2023, U.S. Appl. No. 17/332,146, filed May 21, 2021.
Office Action dated Nov. 7, 2022, U.S. Appl. No. 17/840,449, filed Jun. 14, 2021.
Notice of Allowance dated Dec. 22, 2022, U.S. Appl. No. 17/840,449, filed Jun. 14, 2021.

* cited by examiner

INTERNATIONAL CALL ROUTE GENERATION BASED ON ANALYZING MINUTES OF USE KEY PERFORMANCE INDICATORS (KPIS) ASSOCIATED WITH AN INTERNATIONAL COMMUNICATION SERVICE CARRIER

CROSS-REFERENCE TO RELATED APPLICATIONS

This application is a divisional of and claims priority under 35 U.S.C. § 120 to U.S. patent application Ser. No. 17/332,146, filed on May 27, 2021, entitled "International Call Route Generation," by Jia Barton, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A call to an international number may be connected to its destination by different routes. For example, a first route may place the call over a first international communication service carrier's network or a second route may place the call over a second international communication service carrier's network to the same number.

SUMMARY

In an embodiment, a method of providing a prioritized international call route list to a network element, where the international call route list associates alternative international communication service carrier routes with an international telephone number is disclosed. The method comprises building a plurality of prioritized international call route lists by an international call routing management system based on key performance indicators (KPIs) of international call routes and based on price rating sheet data provided by international communication service carriers, wherein the KPIs comprise a minutes of use KPI, adapting the prioritized international call route lists based on predefined overrides by the international call routing management system, and sending the adapted prioritized international call route lists by the international call routing management system to a central routing function (CRF) platform. The method further comprises receiving a request for a prioritized international call route list by the CRF platform from a network element, where the request comprises an international telephone number and accessing a prioritized international call route list associated with the international telephone number by the CRF platform from among the plurality of adapted prioritized international call route lists. The method further comprises determining by the CRF platform that the international telephone number is associated with a percent allocation rule, based on the percent allocation rule removing the first priority call route from the prioritized call route list associated with the international telephone number by the CRF platform to make a curtailed prioritized international call route list, and sending the curtailed prioritized international call route list by the CRF platform to the network element.

In another embodiment, a central routing function (CRF) platform is disclosed. The CRF platform comprises at least one processor, a non-transitory memory communicatively coupled to the at least one processor that stores a plurality of prioritized international call route lists where each prioritized international call route list associates alternative international communication service carrier routes in a prioritized order with an international telephone number, and a call process application stored in the non-transitory memory. When executed by the processor, the call process application receives a request for a prioritized international call route list from a network element, where the request comprises an international telephone number, pads out the international telephone number received from the network element to form a 15-digit number, looks up a prioritized international route list using the 15-digit number in the non-transitory memory, and sends the prioritized international route list to the network element.

In yet another embodiment, an international call routing management system is disclosed. The system comprises at least one processor, a non-transitory memory communicatively coupled to the at least one processor an international communication service carriers price rating sheet data store, a key performance indicators (KPIs) data store, and an application stored in the non-transitory memory. When executed by the processor, the application reads KPIs out of the KPI data store including minutes of use KPIs associated with international communication service carriers and reads international communication service carrier price rating sheets out of the price rating sheet data store. The application further, for each of a plurality of international call routes, analyzes the international communication service carrier price rating sheets to determine a cost for the international call route for each of the international communication service carriers that support the international call route. The application further, for at least some of the plurality of international call routes, analyzes the minutes of use KPI associated with an international communication service carrier that supports the international call route to determine if a contracted minutes of use associated with the international communication service carrier has been satisfied for a current evaluation period. The application further, for at least some of the plurality of international call routes, defines a prioritized list of carrier supported routes based on the determination whether the contracted minutes of use has been satisfied and based on the cost for the international communication service carriers to support the international call route. The application further transmits a file associating each of the plurality of international call routes to the prioritized list of carrier supported routes to a central routing function (CRF), whereby the CRF responds to requests for international call routes to complete international calls.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
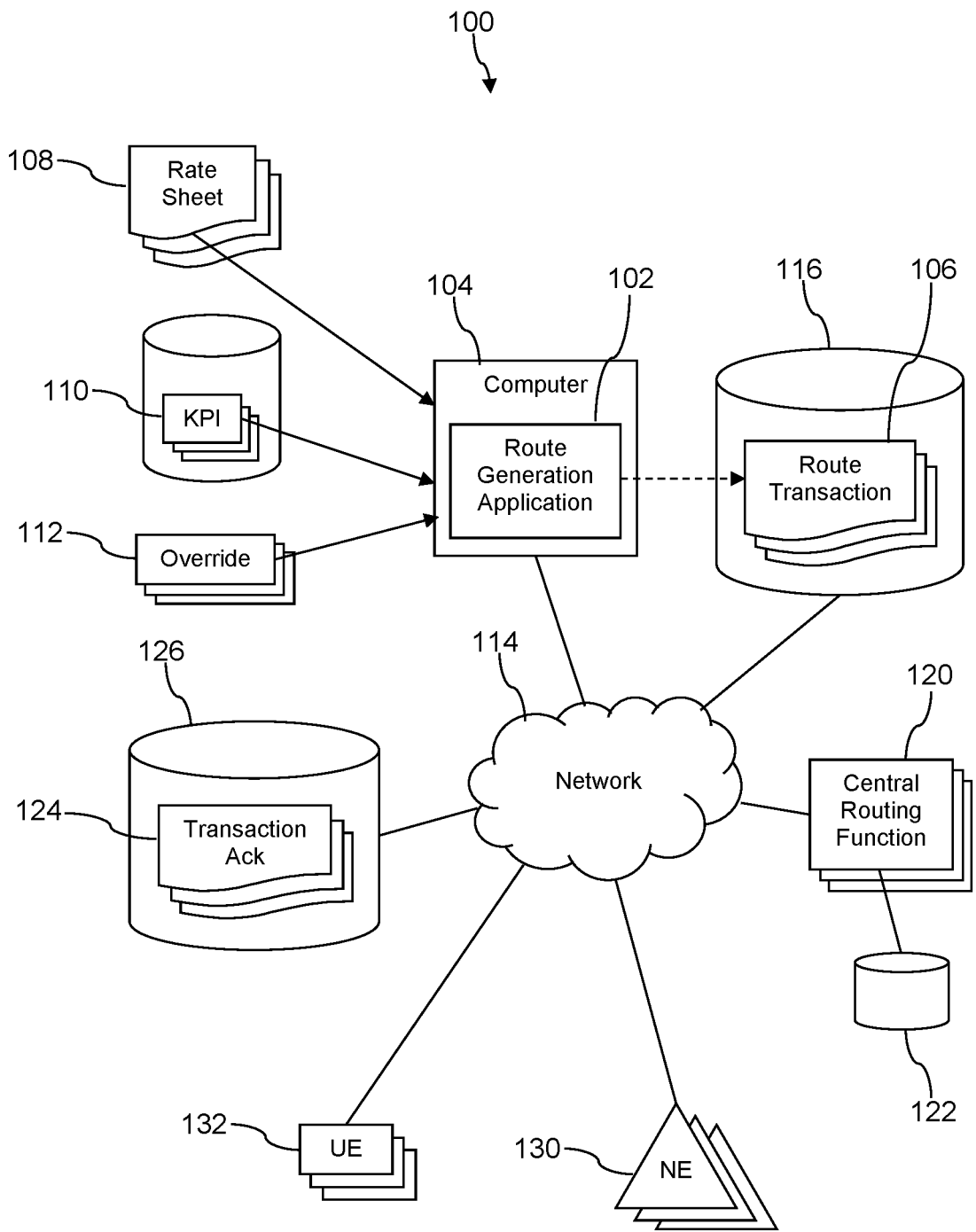
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system for identifying and delivering prioritized lists of alternative call routes to complete a call in a communication system. A network element (NE) may request a central routing function (CRF) to provide a list of call routes for completing a call from a call originator to a call destination such as to a user equipment (UE), to a content server, or to an application server. In some cases, the originator may be the NE requesting the call routes (e.g., the NE may be seeking a route from it to a designated terminator). In other cases the originator may not be the NE but may be a UE or a computer. In some cases, the call destination may be a communication service carrier who will receive the call from the NE and deliver it to an end-point UE or to yet another communication service carrier. In other cases the call destination may not be the next communication service carrier but may be a UE or a computer.

In many instances the call can be completed via a number of alternative different call routes or call paths, and the challenge is providing a relatively short list of alternative call routes that optimize the call according to one or more operational parameters. The NE initially attempts to complete the call with the highest priority call route. If the first call route attempted fails, the NE next attempts to complete the call with the second highest priority call route. If the second call route attempted fails, the NE next attempts to complete the call with the third highest priority call route, and so on until the call is completed or the list of alternative routes are exhausted. A call route can be understood to be a communication path or communication link that may pass from an origination device to a termination device via a plurality of intermediate nodes. Different call routes comprise one or more different intermediate nodes. Hereinafter call routes may be referred to as routes to be more concise.

One of the operational parameters considered in determining a prioritized list of routes may be costs of the different available routes, whereby to prioritize routes, at least in part, based on a least cost routing criteria. A route generation application executing on a computer can analyze rate sheets provided by communication service carriers who support the routes in the context of data about routes already on record. This data on record defines each route as a sequence of nodes to establish communication coupling between the originator and the terminator and optionally comprises information about those nodes or links between the nodes. For each of a plurality of different calls (e.g., communication coupling from originator to terminator), a cost for each of the available routes to complete the call is determined by the route generation application and used to prioritize the list of alternative routes for that call. The route generation application stores each of the routes in a route list for a given call in priority order. For example, if a call is a communication path between a point A and a point B, the route list for this call may comprise a first entry which is the highest priority route from point A to point B, a second entry which is the second highest priority route from point A to point B, a third entry which is the third highest priority from point A to point B, etc.

In an embodiment, the route generation application may restrict each route list to a maximum of 6 routes. In another embodiment, the route generation application may restrict each route list to a maximum of fewer than 6 routes or to a maximum that is greater than 6 routes. The route generation application may be said to restrict each route list to a predefined maximum number of routes. If there are more than the maximum number of routes available for a given call, the route generation application includes only the maximum number of routes in the route list for that call and the remaining routes are not included in the route list. If there are fewer routes available for a given call, the route generation application may include all of the available routes in the route list in prioritized order.

The route generation application builds route lists for each of the different calls that it knows to exist. The route generation application may build the route lists periodically, such as once per day, once per week, or on some other time interval. The route generation application may build the route lists on command. Because the rate sheets provided by communication service carriers change over time, the prioritization of routes may change. Likewise, the routes that different carriers support may change. These changes can result in the route generation application building different prioritized routes for at least some of the different calls.

When the route generation application has built the route lists, it may propagate or send the new route lists to the CRF, for example in the form of a batch file. In some circumstances, the route generation application may compare the route lists it creates to a set of route lists previously configured into the CRF, determine what route lists have changed, and send a reduced set of route lists representing only the change—a so-called delta of route lists—to the CRF. The CRF processes the route lists received from the route generation application and configures these route lists into one or more data tables that the CRF uses to provide routes in response to route requests.

When an NE needs to route a call, the NE sends a query to the CRF with information about the call. This information comprises a phone number of the destination device, for example an international telephone number of a terminating device. The CRF uses the phone number to index into the prioritized routes defined by the route generation application and returns a prioritized list of routes to the requesting NE.

Part of the challenge for the route generation application analyzing least cost routes for international calls is that there are often different rating approaches used by different international communication service carriers. For example, a first international carrier applies different rates for calls it carries or routes within Canada for different cities. A second international carrier uses a uniform rate across all of Canada. A third international carrier uses an intermediate granularity rate, for example different rates in different provinces of Canada. Different sets of communication service carriers may provide service in different countries. Example international communication service carriers comprise Belgacom International Carrier Services (BICS), Business Telecommunication Services (BTS), Deutsche Telecom, i-Basis, Identidad, Last Mile, Telcel, TalkTel, TATA, and Telecom Malaysia.

In an embodiment, the route generation application optimizes based on both costs and based on key performance indicators (KPIs) that have been determined for the different routes. Thus, the route generation application can prioritize the routes in a route list associated with a given call based on the costs of the different possible routes but also based on the KPIs associated with these different possible routes. As an example, a minutes-of-use KPI may be tracked by international communication service carriers per period of time (e.g., weekly, monthly, quarterly, or some other interval of time) and provided to the route generation application. The route generation application may analyze the minutes-of-use KPI data provided by carriers in combination with rate sheets provided by the carriers to jointly optimize a cost criteria and a minutes-of-use criteria. For example, an international communication service carrier may reach an agreement to support a guaranteed minutes-of-use per month with the operator of the CRF. The route generation application may build prioritized route lists balancing both considerations of costs of the routes and minutes-of-use KPIs. For example, if an evaluation period is half complete but less than half the guaranteed minutes-of-use per period have been accumulated by the carrier, the route generation application may move the routes associated with the subject carrier higher in the prioritized route lists than otherwise to increase the minutes-of-use tallied by the subject carrier. Contrariwise, if the evaluation period is half complete but three-quarters of the guaranteed minutes-of-use per period have been accumulated for the carrier, the route generation application may move the routes associated with the subject carrier lower in the prioritized route lists than otherwise. In a like manner, other KPIs may be balanced with each other and with cost considerations.

In an embodiment, a carrier whose guaranteed minutes-of-use have not yet been delivered during the in-progress evaluation period may be placed in the highest priority position in the route lists for calls it is able to support. After the guaranteed minutes-of-use have been delivered for the in-progress evaluation period, the route generation application may discontinue consideration of that carrier's minutes-of-use KPI for the remainder of the evaluation period.

In an embodiment, international numbers routed by network elements may take different formats. For example, an international number may be an 11-digit number, a 12-digit number, a 13-digit number, a 14-digit number, or a 15-digit number. Sometimes different format numbers may associate to the same international dial code. In the past, the CRF may have had functionally duplicative entries in its provisioning tables to support routing calls to the same end destination (e.g., same dial code) for different length digit strings. This is inefficient in that it consumes extra memory space to contain the associated data entries and in that it may take more processing steps to associate the dialed number to the international dial code.

In an embodiment, the CRF extends table key values, which are dial codes that associate to dialed number values, in its route list lookup table to have 15 characters, for example by adding one or more characters to extend the dial codes to 15 characters. In an embodiment, the dial codes are ASCII characters, and digit strings less than 15 digits have one or more instances of ASCII 'A' suffixed to pad out the dialed number digit string to 15 characters. When the CRF receives a request from an NE with an international number having less than 15 digits, the CRF first suffixes one or more '0' values to extend the dialed number to 15 digits. Then the CRF uses the 15-digit extended dialed number to look up a route list in the route list lookup table based on the 15-digit string, thereby avoiding supplying alternative length digit strings in its provisioning tables. This innovation provides a particular technical solution to the technical problem of mapping alternative length international phone numbers to a prioritized list of routes.

Turning now to FIG. 1, a communication system 100 is described. In an embodiment, the system 100 comprises a route generation application 102 executing on a computer system 104 that builds call route transactions 106 based on inputs provided by a plurality of carrier rate sheets 108, a plurality of carrier network key performance indicators (KPIs) 110, and optionally one or more overrides 112. Computer systems are described further hereinafter. The computer system 104 is communicatively coupled to a network 114 that promotes the computer system 104 communicating with a variety of other computers and or data stores. While the rate sheets 108, KPIs 110, and overrides 112 are illustrated in FIG. 1 as providing inputs directly to the computer system 104, in an embodiment, the inputs from these entities 108, 110, 112 may be sent to the computer system 104 and to the route generation application 102 via the network 114. The route generation application 102 may transmit the route transactions 106 via the network 114 to be stored in a data store 116. In an embodiment, the call route transactions 106 designate international call routes. In an embodiment, the call route transactions 106 designate domestic call routes. In an embodiment, the call route transactions 106 designate wholesale call routes. In an embodiment, the call route transactions 106 designate international call routes and domestic call routes. In an embodiment, the call route transactions 106 designate international call routes, domestic call routes, and wholesale call routes. In an embodiment, the network 114 comprises one or more public networks, one or more private networks, or a combination thereof.

The system 100 further comprises a central routing function (CRF) 120 that is communicatively coupled to the network 114. The CRF 120 retrieves the route transactions 106 from the data store 116 and builds call route lists based on executing the call route transactions 106 and stores these built call route lists in a route data store 122. These call route lists are prioritized lists of alternative call routes, each of which may be used to route a call from a network element (NEs) 130 to a user equipment 132 or other call endpoint or call destination. In an embodiment, the call route lists built by the CRF 120 designate international call routes. In an embodiment, the call route lists built by the CRF 120 designate domestic call routes. In an embodiment, the call route lists built by the CRF 120 designate wholesale call routes. In an embodiment, the call route lists built by the CRF 120 designate international call routes and domestic call routes. In an embodiment, the call route lists built by the CRF 120 designate international call routes, domestic call routes, and wholesale call routes. Each different call route list associates to a dial code that covers one or more different phone numbers, for example a range of numbers.

As the CRF 120 builds the call route lists it generates transaction acknowledgments 124 and stores these in a transaction acknowledgement data store 126. The NEs 130 may be any network equipment that is in the call path (e.g., carries bearer traffic). In an embodiment, the NEs 130 may comprise a telecommunications switch. In an embodiment, the NEs 130 may comprise a gateway. In an embodiment, the NEs 130 may comprise a router. In an embodiment, the NEs 130 may comprise a session border controller (SBC). In an embodiment, the NEs 130 may comprise a break-out gateway control function (BGCF). In an embodiment, the NEs 130 may comprise a media gateway control function (MGCF).

A NE 130 that is placing a call may send a request for a list of call routes to the CRF 120, where the request identifies a call destination. A communication path from the NE 130 to a call destination may be called a call route, and there may be multiple feasible call routes between the NE 130 and a call destination. In an embodiment, if the call destination is an international phone number, the call routes may designate one or more international communication service carrier as the call destination, in the sense that the NE 130 may route the call to the international communication service carrier, and the carrier then gets the call to the destination. In an embodiment, the destination is a destination switch or telephone. The CRF 120 provides a call route list to the NE 130 that lists a plurality of call routes in a prioritized order. The priority order may be determined by the route generation application 102, at least in part, based on an analysis of costs of alternative call routes, which may be referred to as least cost route analysis. The priority order may be determined by the route generation application 102, at least in part, based on an analysis by the route generation application 102 of the KPIs 110. The priority order may be determined by the route generation application 102, at least in part, based on an analysis by the route generation application 102 of the overrides 112. In an embodiment, the priority order may desirably be determined by the route generation application 102 based on a multivariate optimization of each of costs of alternative routes, KPIs 110, and overrides 112. In an embodiment, the CRF 120 returns no more than a predefined maximum number of call routes to the requesting NE 130. This maximum number may be 6 call routes. Alternatively, this predefined maximum number may be less than 6 call routes or more than 6 call routes but less than 50 call routes. In an embodiment, the predefined maximum may be 7 call routes, 8 call routes, 9 call routes, 10 call routes, 11 call routes, 12 call routes, 13 call routes, 14 call routes, or 15 call routes. In an embodiment, a call route specifies a uniform resource locator (URL) designating another network element to which the NE 130 routes the call. In an embodiment, a call route specifies a URL designating a carrier (e.g, an international carrier). In some contexts, the URL designating the network element may be said to associate to an international communication service carrier that operates the network element.

The rate sheets 108 may be provided by communication service carriers and identify tolls they apply for routing calls via their network infrastructure or network infrastructure that they pay for. The rate sheets 108 may identify tolls for international calls. The rate sheets 108 may identify tolls for domestic calls. It is observed that different communication carriers may structure their rate sheets differently. For example, a first international communication carrier may designate a single rate that applies to routing any call to a specific country, a second international communication carrier may designate different rates for a plurality of different provinces or states of the specific country, and a third international communication carrier may designate different rates for each of a plurality of different cities in the specific country. The communication carriers may send updated rate sheets 108 to the route generation application 102 (or make different rate sheets available at a data store accessible by the route generation application 102) from time to time. Different communication carriers may update their respective rate sheets 108 at different times and in an uncoordinated fashion.

The KPIs 110 may be collected by the communication service carrier that operates the CRF 120 and stored in a data store. The KPIs 110 may be updated periodically to reflect latest conditions in the different network infrastructures, for example hourly, twice daily, daily, weekly, or on some other time interval. The KPIs 110 may comprise a minutes of usage accumulated during a current reporting or evaluation time period. The minutes of usage KPI 110 may record minutes of usage delivered by a communication service carrier based on traffic directed to that carrier by the CRF 120. In an embodiment, the minutes of usage may be determined based on the signaling between the communication service carrier that operates the CRF 120 and the communication service carrier (e.g., the target carrier) that requests the prioritized route list from the CRF 120. For example, the time between a "200" SIP OK response to a SIP invite sent by the target carrier and a "BYE" SIP message received from or sent to the target carrier may be used to calculate the minutes of usage of a given call, and these minutes of usage accumulated for all calls associated with that target carrier to determine the total minutes of usage per evaluation time period. In an embodiment, an international session border controller operated by the communication service carrier that operates the CRF 120 may monitor the SIP messages and provide minutes of usage KPI data. The KPIs 110 may comprise information about post-dial delay. The KPIs 110 may comprise information about average route advances (e.g., SIP 503 response). The KPIs 110 may comprise information about average duration of call. The KPIs 110 may comprise average mean opinion score (average MOS). The KPIs 110 may comprise average killed calls (SIP 603 response). The KPIs 110 may comprise average successful calls (SIP 200 response). The KPIs 110 may comprise quality of service (QoS) reporting information.

The overrides may specify certain conditions that apply for determining prioritization of specific call routes that vary from the least cost routing criteria and/or from the optimizing of KPIs. For example, a first override may exclude a carrier from routing for a specific call route. A second override may designate that a carrier is given precedence over the least cost routing criteria for a specific route. A third override may designate that a carrier is subordinated to the precedence of the least cost routing criteria for a specific route. A fourth override may designate that a carrier is included as the last route (e.g., lowest priority route) in a route list for a specific route.

The route generation application 102 may execute and build route transactions 106 once per day, once per week, once per month, or on some other periodic basis. The route generation application 102 re-executes because its determination of prioritization changes based on changes in the rate sheets 108, changes in the KPIs 110, and/or changes in the overrides 112. In an embodiment, the route generation application 102 reviews the transaction acknowledgements 124 stored in the data store 126 and adapts its generation of route transactions 106 accordingly. It will be appreciated that the route generation application 102 may execute relatively often whereby to keep the prioritization of route lists maintained by the CRF 120 closely aligned with changing rate sheets 108, changing KPIs 110, and changing overrides 112. For example, in an embodiment, the route generation application 102 may execute daily or weekly.

When the CRF 120 builds the prioritized call route lists stored in the data store 122 it may establish the primary key or index of each international route list by a 15-digit phone number (e.g., a dial code) that designates a range of 15-digit phone numbers. For example, a 15-digit phone number '123456789100000' may designate a range of 100,000 different 15-digit phone numbers from '123456789100000' to '123456789199999.' For example, a 15-digit phone number '123456789120000' may designate a range of 10,000 different 15-digit phone numbers from '123456789120000' to '123456789129999.'

In an embodiment, the dial codes are represented as 15-character ASCII values. When a dial code has less than 15 digits, the dial code (e.g., the primary key of the route lists table) is extended by suffixing the ASCII character "A" (e.g., the character associated with the hexadecimal value 41) one or more times to the dial code. In an embodiment, any ASCII printable character that is greater than '9' (e.g., the character associated with the hexadecimal value 39 in the ASCII encoding system) may be used for suffixing the dial code to extend it to 15 ASCII characters.

When the CRF 120 receives a request from a NE 130 to provide a prioritized list of routes including an international phone number, if the international phone number comprises less than 15 digits, the CRF 120 extends the dialed number with zeros to make the extended dialed phone number 15 digits. The CRF 120 uses the padded out 15-digit dialed number to index into the call routes data store 122 to obtain the prioritized list of routes associated with that padded-out 15-digit number. This involves finding the dial code primary key that associates to the dialed number (e.g., the dialed number falls into the range of values associated with the dial code primary key). The CRF 120 retrieves the prioritized list of routes associated with this dial code. In an embodiment, finding or looking up the prioritized international route list comprises finding an international telephone number in a non-transitory memory of the CRF 120 or in the data store 122 that has a range that covers the international telephone number provided in the request from the network element.

The CRF 120 then returns the prioritized list of routes to the requesting NE 130. The NE 130 then completes the call it is placing by attempting to complete the call using the highest priority route in the received route list. If this route fails, the NE 130 attempts to complete the call using the second highest priority route in the received route list. If the second highest priority route fails, the NE 130 attempts to complete the call using the third highest priority route in the received route list, and so on.

In an embodiment, the CRF 120 provides support for a percentage allocation of call routes when responding to requests for prioritized route lists from the NEs 130. The percentage allocation can designate a distribution of calls among international communication service carriers. For example, a percentage distribution may designate that 50% of international calls directed to a first call route be routed to a first communication service carrier and 50% of international calls directed to the first call route be routed to a second communication service carrier. Over time, the CRF 120 would provide prioritized call route lists to requesting NEs 130 specifying the first call route such that the distribution of calls between the first and second carrier on this first call route approach 50% each. Alternatively, if the percentage allocation stipulates 65% of international calls directed to a second call route be routed to the first communication service carrier and 35% of international calls directed to the second call route be routed to the second communication service carrier, over time the CRF 120 would provide prioritized call route lists to requesting NEs 130 specifying the second call route such that the distribution of calls between the first and second carrier on this second call route approach 65% and 35% respectively.

In an embodiment, the CRF 120 supports percentage allocation of call routes by providing a prioritized route list that expunges one of the routes supported by a communication service carrier designated in a percentage allocation stipulation. Expunging a route from a call route list may be referred to as curtailing the call route list in some contexts. For example, in about half of the requests from NEs 130 for a prioritized call route for the first call route, the first communication service carrier is expunged and only the second communication service carrier is presented in highest priority position, and in the remaining half of the requests from NEs 130 for a prioritized call route for the first call route, the second communication service carrier is expunged and only the first communication service carrier is presented in the highest priority position. In both these types of prioritized call route responses, there may be additional call routes associated with communication service carriers other than the first and second communication service carriers. It is understood that the CRF 120 may comprise a plurality of separate computers that execute software to provide the central routing function. Additionally, a single computer may execute a plurality of different instances of the central routing function, for example on different processors and/or different cores of the computer. In an embodiment, the percentage allocation operation is performed by each computer and/or each instance of the central routing function independently and without coordinating with other instances or other computers. The percentage allocation, hence, may not be maintained if analyzed over a short duration of time, but the percentage allocation is approached in a converging fashion over time.

The percentage allocation may be applied to the first (e.g., highest priority) route in the route list. Alternatively, the percentage allocation may be applied to the second priority route in the route list or the third priority route in the route list or the fourth priority route in the route list. This may be accomplished by associating a priority with each route in the route list. If a route is associated with a 100% percentage, then that route is fixed in its priority position in the route list. For example, if a route list comprises five routes listed in the order {route A, 100%}, {route B, 60%}, {route C, 40%}, {route D, 100%}, {route E, 100%}, then route A will always be the first priority route, route D will always be the third priority route, and route E will always be the fourth priority route. The second priority route will be route B 60% of the time and route C 40% of the time. As another example, if a route list comprises fix routes listed in the order {route A, 100%}, {route B, 100%}, {route C, 25%}, {route D, 50%}, {route E, 25%}, {route F, 100%}, then route A will always be the first priority route, route B will always be the second priority route, and route F will always be the fourth priority route. The third priority route will be route C 25% of the time, route D 50% of the time, and route E 25% of the time.

Figure 2:
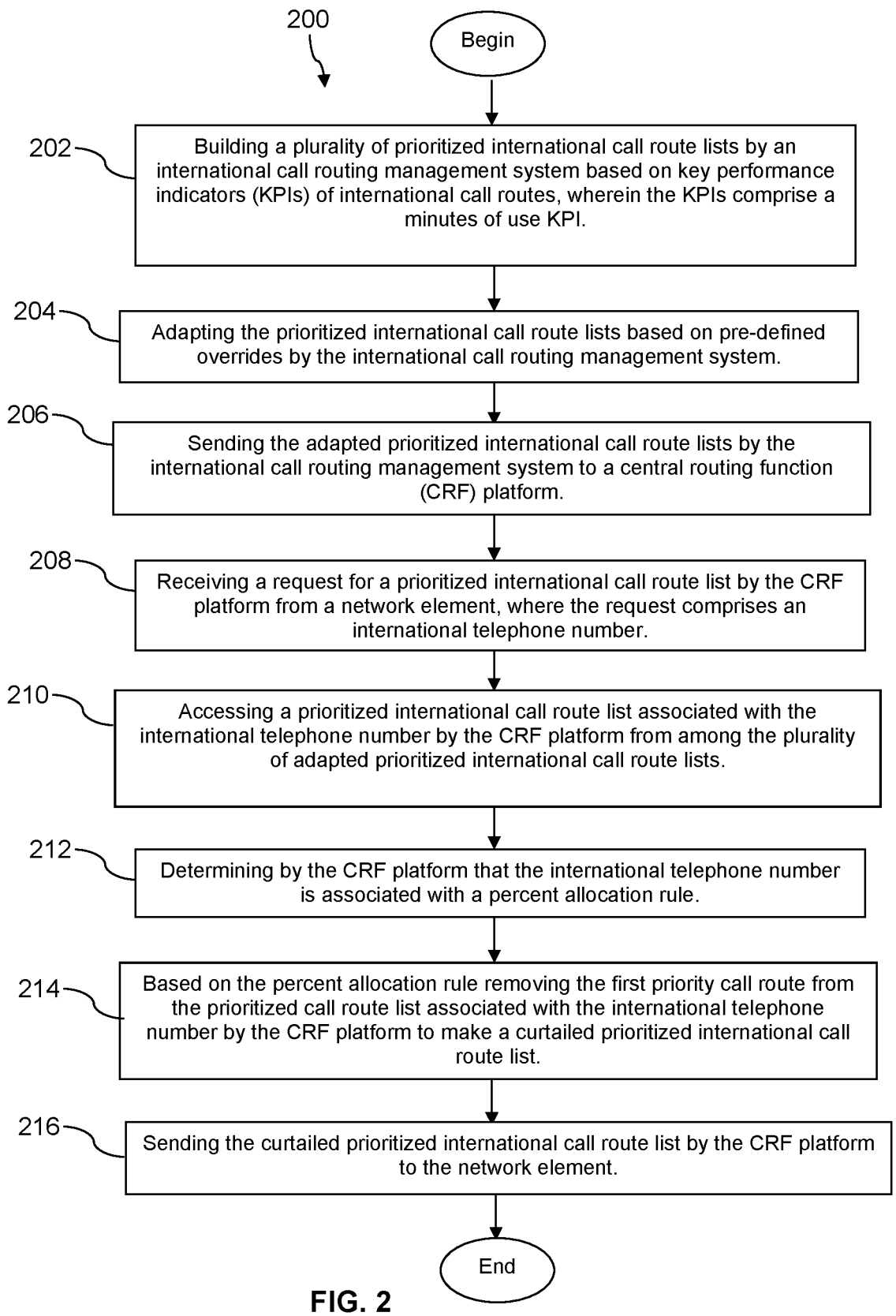
FIG. 2 is a flow chart of a method according to an embodiment of the disclosure.

Turning now to FIG. 2, a method 200 is described. In an embodiment, the method 200 comprises a method of providing a prioritized international call route list to a network element, where the international call route list associates alternative international communication service carrier routes with an international telephone number. At block 202, the method 200 comprises building a plurality of prioritized international call route lists by an international call routing management system based on key performance indicators (KPIs) of international call routes, wherein the KPIs comprise a minutes of use KPI. For example, the route generation application 102 executing on the computer 104 may be considered to be an international call routing management system and may build the plurality of prioritized international call route lists. In an embodiment, the KPIs comprise a post-dial delay KPI, an average route advance KPI, an average duration of call KPI, an average mean opinion score KPI, an average killed calls KPI, and an average successful calls KPI. The prioritized international call route lists comprise at least one international route that identifies a uniform resource locator (URL) associated with an international communication service carrier that can complete the subject international call. In an embodiment, the processing of block 202 involves building the plurality of prioritized international call route lists additionally based in part on price rating sheet data provided ty international communication service carriers.

At block 204, the method 200 comprises adapting the prioritized international call route lists based on pre-defined overrides by the international call routing management system. At block 206, the method 200 comprises sending the adapted prioritized international call route lists by the international call routing management system to a central routing function (CRF) platform. The processing of block 206 may comprise the route generation application 102 storing the adapted prioritized international call route lists as route transactions 106 in the data store 116 and the CRF 120 accessing the route transactions 106 from the data store 116 via the network 114.

In an embodiment, the CRF platform processes the adapted prioritized international call route lists to build a dial code table used to provide prioritized route lists to network elements on request. The dial code table comprises entries that are associated with a table key that is a dial code and that comprise one or more international call routes associated with the dial code. The dial code may represent an international telephone number or a range of telephone numbers. In an embodiment, the CRF platform may extend the dial code (e.g., international telephone number) to pad it out to 15 digits, for example by suffixing on a predefined value onto a phone number less than 15 digits one or more times. For example, the CRF platform may add one or more ASCII 'A' characters (e.g., hexadecimal value 41) to the end of the dial code to pad it out to 15 digits.

At block 208, the method 200 comprises receiving a request for a prioritized international call route list by the CRF platform from a network element, where the request comprises an international telephone number. In an embodiment, the network element is selected from the list consisting of a router, a session border controller, a break-out gateway control function, and a media gateway control function.

At block 210, the method 200 comprises accessing a prioritized international call route list (e.g., the dial code table) associated with the international telephone number by the CRF platform from among the plurality of adapted prioritized international call route lists. In an embodiment, each international call route list is associated to an international dial code that comprises 15 ASCII characters, and wherein accessing the prioritized international call route list associated with the international telephone number comprises matching at least part of the international telephone number to the dial code of the international call route list. The processing of block 210 may comprise the CRF 120 reading a prioritized route list from the data store 122 based on using the padded out international telephone number (e.g., padded out with '0' values) as a primary key. In an embodiment, the CRF platform may extend the international telephone number provided in the request received from the network element) to pad it out to 15 digits, for example by suffixing a '0' value onto a phone number less than 15 digits one or more times. The processing of block 210 may comprise the CRF 120 reading a prioritized route list from the data store 122 based on using the padded out phone number as a primary key.

At block 212, the method 200 comprises determining by the CRF platform that the international telephone number is associated with a percent allocation rule. At block 214, the method 200 comprises, based on the percent allocation rule removing the first priority call route from the prioritized call route list associated with the international telephone number by the CRF platform to make a curtailed prioritized international call route list. The processing of block 214 may comprise looking up a count of calls allocated to two or more communication service carriers and comparing the counts to the percentage allocation stipulation. The processing of block 214 may comprise incrementing a count of calls allocated to the communication service carriers, whereby to keep track of percentage allocation of calls among the communication service carriers. At block 216, the method 200 comprises sending the curtailed prioritized international call route list by the CRF platform to the network element.

Figure 3A:
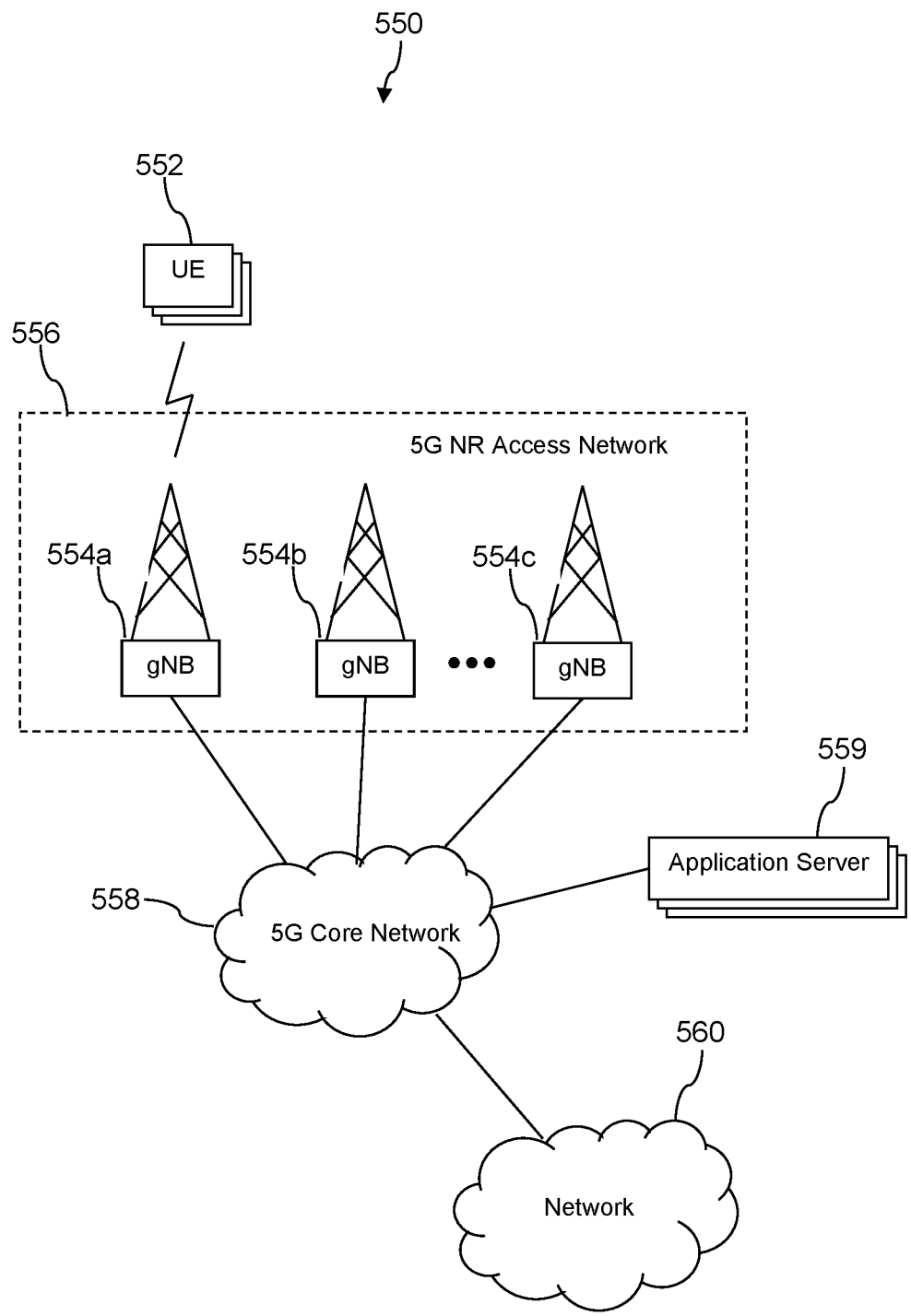
FIG. 3A is a block diagram of a 5G communication network according to an embodiment of the disclosure.

Turning now to FIG. 3A, an exemplary communication system 550 is described. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a gigabit Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 3B:
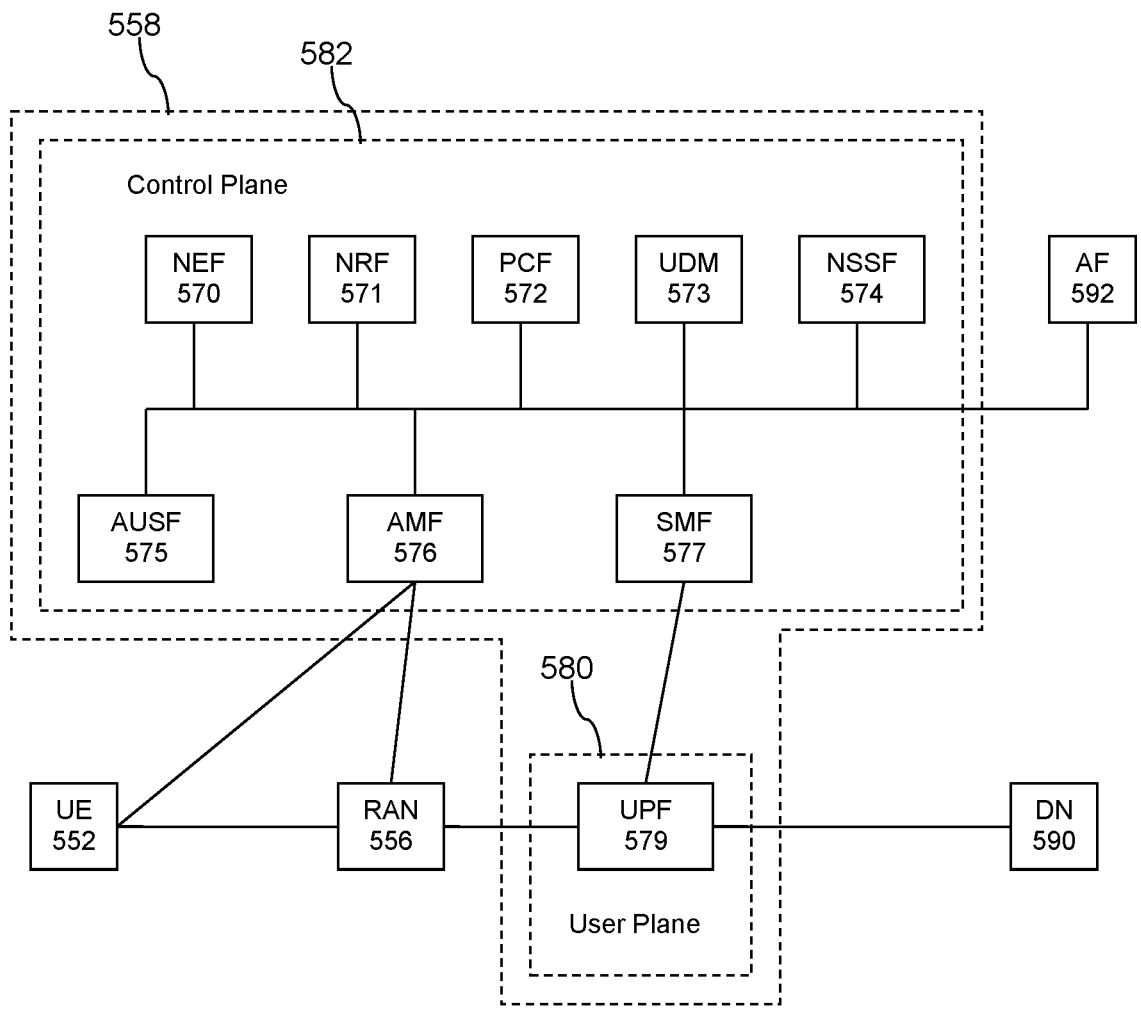
FIG. 3B is a block diagram of a 5G core network according to an embodiment of the disclosure.

Turning now to FIG. 3B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 3A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 4:
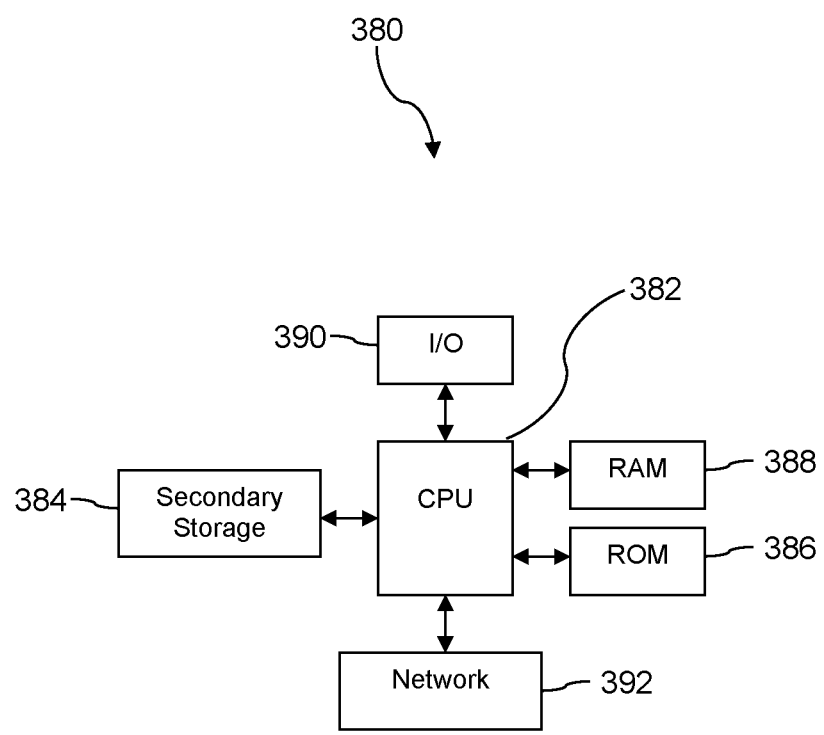
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/ or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of providing a prioritized international call route list to a network element, where the international call route list associates alternative international communication service carrier routes with an international telephone number, comprising:
    building a plurality of prioritized international call route lists by an international call routing management system based on key performance indicators (KPIs) of international call routes, wherein the KPIs comprise a minutes of use KPI;
    adapting the prioritized international call route lists based on pre-defined overrides by the international call routing management system;
    sending the adapted prioritized international call route lists by the international call routing management system to a central routing function (CRF) platform;
    receiving a request for a prioritized international call route list by the CRF platform from a network element, where the request comprises an international telephone number;
    accessing a prioritized international call route list associated with the international telephone number by the CRF platform from among the plurality of adapted prioritized international call route lists;
    determining by the CRF platform that the international telephone number is associated with a percent allocation rule;
    based on the percent allocation rule removing the first priority call route from the prioritized call route list associated with the international telephone number by the CRF platform to make a curtailed prioritized international call route list; and
    sending the curtailed prioritized international call route list by the CRF platform to the network element.

2. The method of claim 1, wherein each prioritized international call route list is associated to an international dial code that comprises 15 ASCII characters, and wherein accessing the prioritized international call route list associated with the international telephone number comprises matching at least part of the international telephone number to the international dial code of the international call route list.

3. The method of claim 2, wherein the CRF platform extends the international telephone number to 15 digits by suffixing at least one '0' at the end of the international telephone number.

4. The method of claim 2, wherein some of the prioritized international call route lists are associated to an international dial code that ends with at least one ASCII character with a value equal to or greater than hexadecimal value 41.

5. The method of claim 2, wherein some of the prioritized international call route lists are associated to an international dial code that ends with at least one ASCII character 'A'.

6. The method of claim 1, wherein the KPIs comprise a post-dial delay KPI, an average route advance KPI, an average duration of call KPI, an average mean opinion score KPI, an average killed calls KPI, and an average successful calls KPI.

7. The method of claim 1, wherein each of the prioritized international call route lists comprises at least one international route that identifies a uniform resource locator (URL) associated with an international communication service carrier.

8. The method of claim 1, wherein the network element is selected from the list consisting of a router, a session border controller, a break-out gateway control function, and a media gateway control function.

9. The method of claim 1, wherein at least some of the prioritized international call route lists are prioritized based on least cost routing in addition to the KPIs.

10. The method of claim 1, wherein the international call routing management system restricts each of the prioritized international call route lists to a predefined maximum number of routes.

11. The method of claim 1, wherein an international communication service carrier whose guaranteed minutes-to-use have not yet been delivered during an in-progress evaluation period is placed in a higher priority position in the prioritized international call route list until the guaranteed minutes-of-use have been delivered for the in-progress evaluation period.

12. The method of claim 1, wherein the building of the plurality of prioritized international call route lists is additionally based in part on price rating sheet data provide by international communication service carriers.

13. The method of claim 1, wherein the predefined overrides specify certain conditions that apply for determining the prioritized international call route lists that vary from the use of the KPIs.

14. The method of claim 13, wherein a predefined override excludes a carrier from routing for a specific call route.

15. The method of claim 13, wherein a predefined override designates that a carrier is given precedence over given criteria for a specific route.

16. The method of claim 13, wherein a predefined override designates that a carrier is subordinated to precedence of a given criteria for a specific route.

17. The method of claim 13, wherein a predefined override designates that a carrier is included as a last route in a route list for a specific route.

18. The method of claim 1, further comprising processing the adapted prioritized international call route lists by the CRF platform to build a dial code table.

19. The method of claim 1, further comprising applying the percent allocation rule, wherein applying the percent allocation rule comprises looking up a count of calls allocated to communication service providers and comparing the counts to a percentage allocation stipulation defined by the percent allocation rule.

20. The method of claim 19, wherein applying the percent allocation rule further comprises incrementing the count of calls allocated to at least one of the communication service carriers to track percentage allocation of calls among the communication service carriers.

* * * * *